United States Patent
Bhutani et al.

(10) Patent No.: US 11,381,853 B1
(45) Date of Patent: Jul. 5, 2022

(54) SYSTEMS AND METHODS FOR GENERATING AND DISTRIBUTING CONTENT FOR CONSUMPTION SURFACES

(71) Applicant: Meta Platforms, Inc., Menlo Park, CA (US)

(72) Inventors: Aayush Bhutani, Redwood City, CA (US); Prakash Chandra, Fremont, CA (US); Amit Agarwal, Newark, CA (US); Xin Su, Santa Clara, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/161,363

(22) Filed: Jan. 28, 2021

(51) Int. Cl.
| | |
|---|---|
| *G06F 15/16* | (2006.01) |
| *H04N 21/2343* | (2011.01) |
| *H04L 65/612* | (2022.01) |
| *G06N 20/00* | (2019.01) |
| *H04N 21/25* | (2011.01) |

(52) U.S. Cl.
CPC ....... *H04N 21/23439* (2013.01); *G06N 20/00* (2019.01); *H04L 65/4084* (2013.01); *H04N 21/234372* (2013.01); *H04N 21/251* (2013.01)

(58) Field of Classification Search
CPC ...... H04N 21/23439; H04N 21/234372; H04L 65/4084

USPC ......................................................... 709/231
See application file for complete search history.

(56) References Cited

U.S. PATENT DOCUMENTS

| | | | | |
|---|---|---|---|---|
| 10,554,926 | B1* | 2/2020 | Post, Jr. ................. | H04N 5/268 |
| 10,834,465 | B1* | 11/2020 | Kansara ............ | H04N 21/4854 |
| 2007/0061862 | A1* | 3/2007 | Berger .................. | H04N 7/163 |
| | | | | 725/62 |
| 2010/0211636 | A1* | 8/2010 | Starkenburg ....... | H04N 21/4821 |
| | | | | 709/224 |
| 2014/0282766 | A1* | 9/2014 | Good ................. | H04N 21/2343 |
| | | | | 725/93 |
| 2016/0359937 | A1* | 12/2016 | Chung ................ | H04L 65/4069 |
| 2018/0014049 | A1* | 1/2018 | Griffin .................. | H04L 65/601 |
| 2020/0304755 | A1* | 9/2020 | Narayan .............. | G06V 40/172 |

* cited by examiner

*Primary Examiner* — Hee Soo Kim
(74) *Attorney, Agent, or Firm* — Sheppard Mullin Richter & Hampton

(57) ABSTRACT

Systems, methods, and non-transitory computer-readable media can be configured to determine a request for a video from a client device, wherein the video is associated with a plurality of reframed versions of the video. A reframed version of the video to provide in response to the request can be determined based at least in part on a consumption surface associated with the client device. The reframed version of the video can be provided to the client device for display.

20 Claims, 11 Drawing Sheets

SYSTEMS AND METHODS FOR GENERATING AND DISTRIBUTING CONTENT FOR CONSUMPTION SURFACES

FIELD OF THE INVENTION

The present technology relates to the field of digital video processing. More particularly, the present technology relates to generating and distributing content for consumption surfaces.

BACKGROUND

Today, people often utilize computing devices (or systems) for a wide variety of purposes. For example, users can utilize computing devices to access a social networking system (or service). The users can utilize the computing devices to interact with one another, share content items, and view content items via the social networking system. For example, a user may share a content item, such as an image, a video, an article, or a link, via a social networking system. Other users may access the social networking system and interact with the shared content item. Before posting content items on the social networking system, users may attempt to customize the content items for their intended audience.

SUMMARY

Various embodiments of the present technology can include systems, methods, and non-transitory computer readable media configured to determine a request for a video from a client device, wherein the video is associated with a plurality of reframed versions of the video. A reframed version of the video to provide in response to the request can be determined based at least in part on a consumption surface associated with the client device. The reframed version of the video can be provided to the client device for display.

In an embodiment, the plurality of reframed versions of the video include at least a first reframed version of the video in a first aspect ratio and a second reframed version of the video in a second aspect ratio.

In an embodiment, the reframed version of the video corresponds to a given aspect ratio, and wherein the reframed version of the video includes one or more frames of the video that were reframed to fit dimensions associated with the aspect ratio.

In an embodiment, a frame of the video is reframed based on cropping the frame, stretching the frame, or adjusting a zoom level associated with the frame.

In an embodiment, a machine learning model is applied to reframe the frame based on visual features represented in the frame.

In an embodiment, the visual features include one or more people represented in the frame, graphics represented in the frame, an amount and size of text represented in the frame, or borders associated with the frame.

In an embodiment, the machine learning model can be tuned based on a parameter to adjust a level of aggressiveness with which the one or more frames are reframed.

In an embodiment, the machine learning model is tuned based on user feedback that rates a quality of the reframed version of the video.

In an embodiment, the consumption surface is determined based on one or more parameters associated with the client device, and wherein the one or more parameters include a device type associated with the client device, a screen resolution of a display screen associated with the client device, a display orientation of the client device, or a combination thereof.

In an embodiment, the plurality of reframed versions of the video include at least one version of the video that has been reframed in a 1:1 aspect ratio, a 4:5 aspect ratio, a 2:1 aspect ratio, or a 16:9 aspect ratio.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the present technology.

Figure 1:
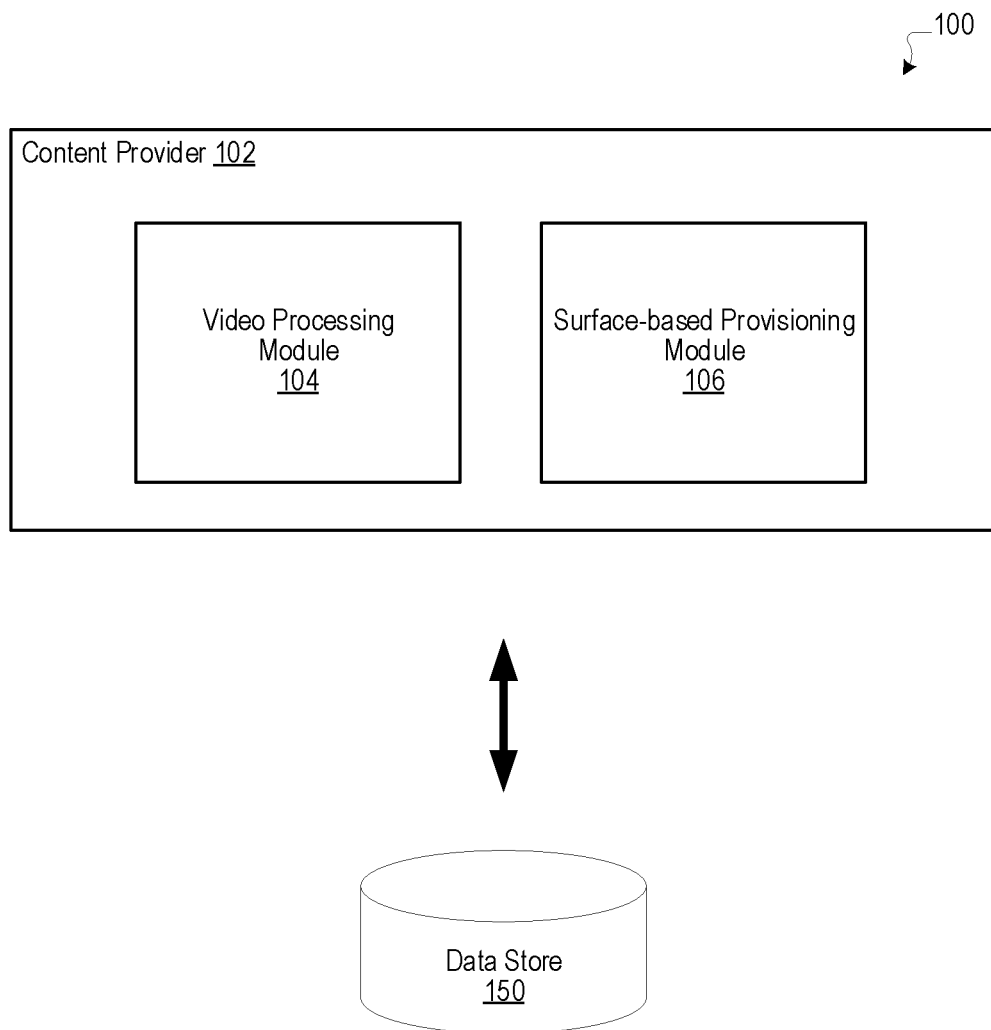
FIG. 1 illustrates an example system including a content provider, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Today, people often utilize computing devices (or systems) for a wide variety of purposes. For example, users can utilize computing devices to access a social networking system (or service). The users can utilize the computing devices to interact with one another, share content items, and view content items via the social networking system. For example, a user may share a content item, such as an image, a video, an article, or a link, via a social networking system. Another user may access the social networking system and interact with the shared content item.

Under conventional approaches, content creators often customize their videos in an effort to attract viewers. For example, a creator can use software tools to manually create copies of a video in various aspect ratios (e.g., 1:1, 4:5, etc.) and encodings (e.g., SD, HD, etc.) to accommodate different types of displays and bandwidth capabilities. In some instances, converting a video from one aspect ratio to another aspect ratio can result in content that appears off frame. For example, converting a video that was recorded in a 16:9 aspect ratio to a 1:1 aspect ratio typically requires cropping frames in the 16:9 aspect ratio to fit the reduced 1:1 aspect ratio. This cropping can result in omission of salient content in frames in the 1:1 aspect ratio. To prevent such omission, creators of videos can rely on third-party tools to manually reframe converted videos. For example, a creator can manually reframe each frame of a video in a 16:9 aspect ratio so that salient content represented in the frames appears centered within frames generated for a 1:1 aspect ratio. In this example, the creator can reframe a frame by manually cropping a portion of a frame in a 16:9 aspect ratio so that salient content represented in the frame fits within the dimensions of a frame having a 1:1 aspect ratio. The reframed version of the video can be published and consumed by viewers. Such conventional approaches are associated with a number of disadvantages. For instance, conventional approaches require content creators to rely on video processing tools to improve video quality and framing. However, less sophisticated creators may not have access to such video processing tools or even the ability to use such tools. As a result, less sophisticated creators may end up publishing videos that are poor in quality and framing, which can adversely affect consumption metrics, such as user engagement and watch time. Further, despite having the ability to convert and reframe content, even sophisticated creators can find the process challenging and time consuming. Further still, conventional approaches do not have the ability to generate and serve optimized versions of a video that have been reframed in different aspect ratios for an optimal consumption surface targeted experience. Thus, conventional approaches pose these and other problems arising in computer technology.

An improved approach rooted in computer technology overcomes the foregoing and other disadvantages associated with conventional approaches specifically arising in the realm of computer technology. In various embodiments, the present technology provides an integrated video publication pipeline that allows users to generate and publish different versions of videos that are optimized for various consumption surfaces (e.g., mobile, desktop, tablet, smart watch, etc.). For example, the present technology can generate multiple versions of a video in different aspect ratios (e.g., 1:1, 4:5, 2:1, 16:9, etc.). Further, the present technology can automatically reframe the videos suited for the consumption surface. For example, a video in a 16:9 aspect ratio can be associated with a first version that has been reframed in a 1:1 aspect ratio, a second version that has been reframed in a 4:5 aspect ratio, and a third version that has been reframed in a 2:1 aspect ratio. In various embodiments, a machine learning model can automatically reframe each frame of the video in the 16:9 aspect ratio for a target aspect ratio. As a result, multiple versions of the video can be generated to provide a tailored and optimal viewing experience for various consumption surfaces. For example, when a client device requests a video, the present technology can evaluate metadata associated with the client device to determine a consumption surface associated with the client device. In this example, the present technology can identify and provide a reframed version of the video that provides the best viewing experience for that consumption surface. The present technology can also determine when a different reframed version of a video should be provided for display based on changes to a consumption surface. For example, an orientation associated with a client device may change while accessing a reframed version of a video. In this example, the present technology can determine in real-time (or near real-time) that a different reframed version of the video provides the best viewing experience based on the changes to the consumption surface. As a result, the present technology can provide the different reframed version to the client device for display. More details relating to the present technology are provided below.

FIG. 1 illustrates an example system 100 including a content provider 102, according to an embodiment of the present technology. As shown in the example of FIG. 1, the content provider 102 can include a video processing module 104 and a surface-based provisioning module 106. In some instances, the example system 100 can include a data store 150 in communication with the content provider 102. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the video processing module 104 and the surface-based provisioning module 106 can be implemented in any suitable combinations.

In some embodiments, the video processing module 104 and the surface-based provisioning module 106 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some instances, the video processing module 104 and the surface-based provisioning module 106 can be, in part or in whole, implemented as software running on one or more computing devices or systems, such as on a server system or a client computing device. In some instances, the video processing module 104 and the surface-based provisioning module 106 can be, in part or in whole, implemented within or configured to operate in conjunction with or be integrated with a social networking system (or service), such as a social networking system 630 of FIG. 6. Likewise, in some instances, the video processing module 104 and the surface-based provisioning module 106 can be, in part or in whole, implemented within or configured to operate in conjunction with or be integrated with a client computing device, such as the user device 610 of FIG. 6. For example, the video processing module 104 and the surface-based provisioning module 106 can be implemented as or within a dedicated application (e.g., app), a program, or an applet running on a user computing device or client computing system. The application incorporating or implementing instructions for performing functionality of the video processing module 104 and the surface-based provisioning module 106 can be created by a developer. The application can be provided to or maintained in a repository. In some instances, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The video processing module 104 and the surface-based provisioning module 106 can be configured to communicate and/or operate with the data store 150, as shown in the example system 100. The data store 150 can be configured to store and maintain various types of data. In some implementations, the data store 150 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 150 can store information that is utilized by the video processing module 104 and the surface-based provisioning module 106. For example, the data store 150 can store information associated with a video and different versions of the video that have been optimized for display on various surfaces. It is contemplated that there can be many variations or other possibilities.

Figure 2A:
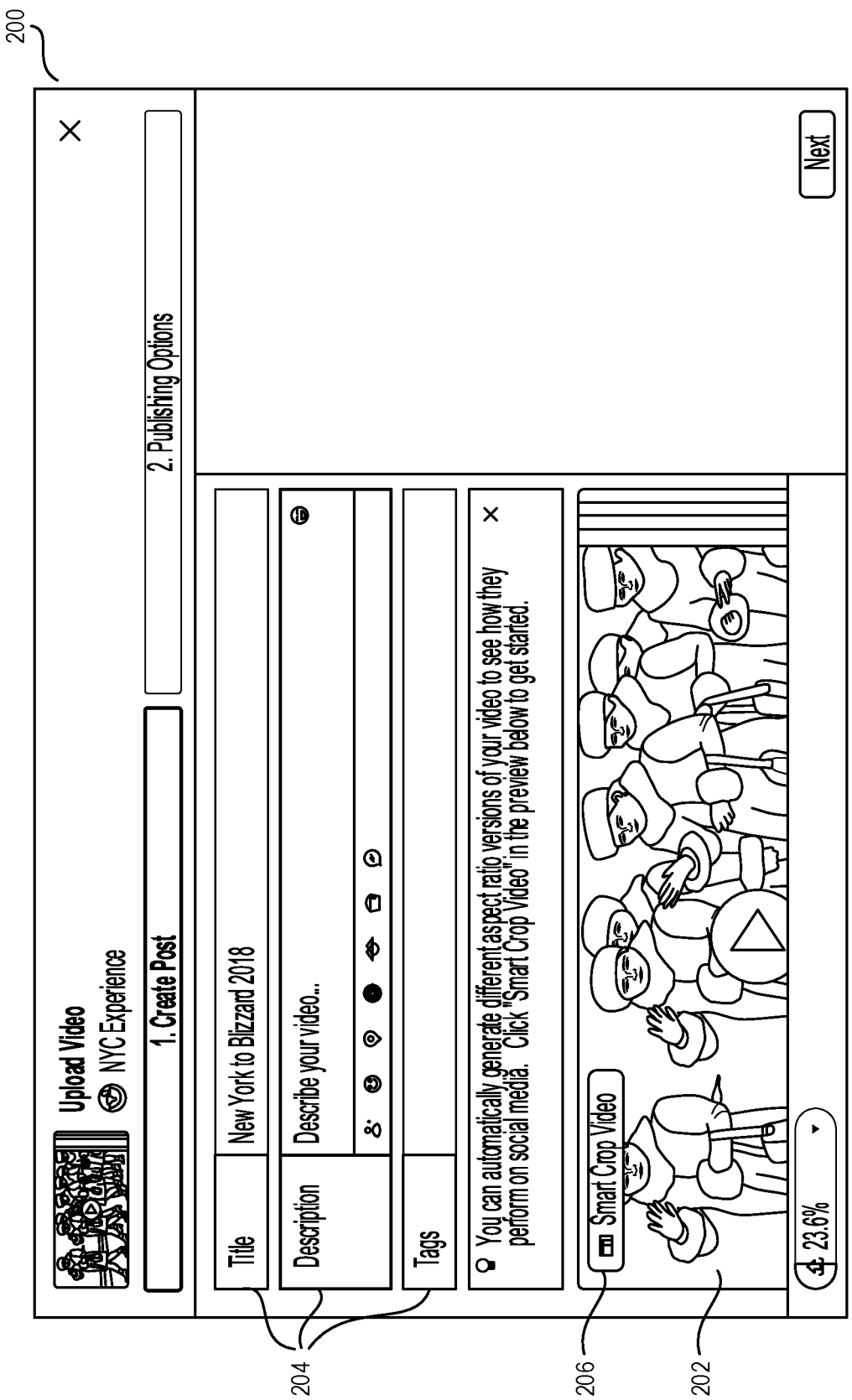
FIGS. 2A-2C illustrates example interfaces, according to an embodiment of the present technology.
Figure 2B:
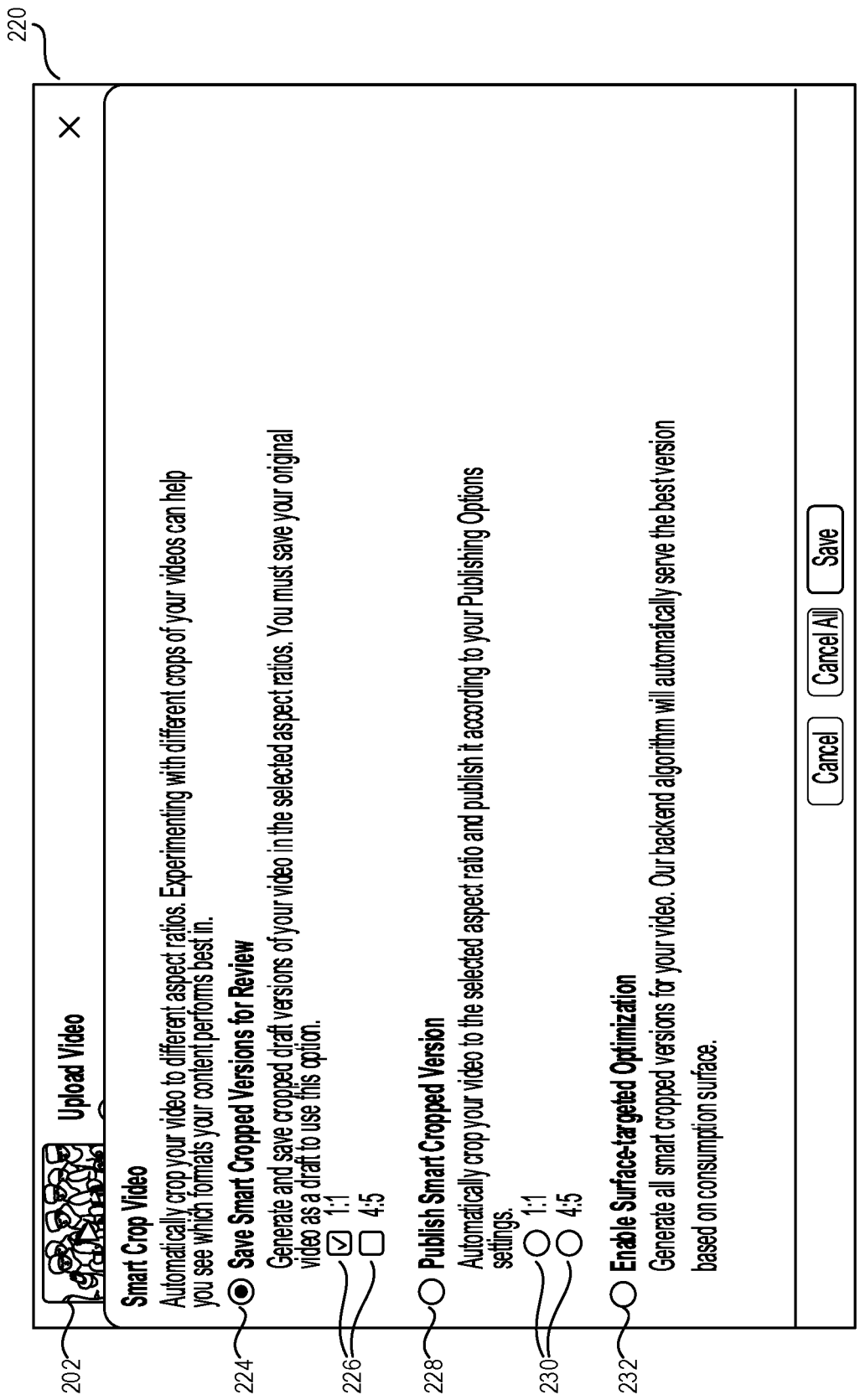

The video processing module 104 can be configured to generate and publish videos via a content provider (e.g., a social networking system). For example, the video processing module 104 can provide an interface 200 generated by a computing device associated with a user for uploading videos to be posted to the content provider, as illustrated in the example of FIG. 2A. The interface 200 can provide options to upload a video 202 and specify information 204 describing the video 202, such as title, description, and tags. The interface 200 can also provide an option 206 to generate reframed versions of the video 202 in various aspect ratios. For example, when the option 206 is selected, the video processing module 104 can provide an interface 220 generated by the computing device associated with the user that includes a number of options for generating reframed versions of the video 202, as illustrated in the example of FIG. 2B. In the example of FIG. 2B, the interface 220 includes a first option 224, a second option 228, and a third option 232 for generating and distributing reframed versions of the video 202. In various embodiments, the first option 224 can be selected to generate reframed versions of the video 202 in one or more selected aspect ratios as drafts for review by the user. The second option 228 can be selected to generate and publish a reframed version of the video 202 in an aspect ratio selected by the user. The third option 232 can be selected to generate reframed versions of the video 202 for automatically optimized distribution based on consumption surface. More details relating to these options are provided below.

In various embodiments, the video processing module 104 can be configured to generate reframed versions of a video in one or more selected aspect ratios as drafts for review. For example, a user can select the first option 224 and one or more target aspect ratios 226 (e.g., 1:1, 4:5, etc.) for the video 202, as shown in FIG. 2B. In this example, the video processing module 104 can generate a reframed version of the video 202 for each selected target aspect ratio 226. For example, a first reframed version of the video 202 can be generated for a first target aspect ratio (e.g., 1:1) and a second reframed version of the video 202 can be generated for a second target aspect ratio (e.g., 4:5). In various embodiments, the video processing module 104 can apply one or more machine learning models to reframe content. For example, the video processing module 104 can provide a video as input to a machine learning model. The machine learning model can automatically reframe each frame of the video to a target aspect ratio based on various approaches for reframing content, such as cropping, stretching, or adjusting zoom levels. In various embodiments, the machine learning model can convert a frame in a source aspect ratio (e.g., 16:9) to a frame in a target aspect ratio (e.g., 1:1) so that salient (or relevant) content (e.g., people, graphics, text, etc.) represented within the frame in the source aspect ratio also appears within the dimensions of the frame in the target aspect ratio. For example, a frame in a 16:9 aspect ratio may represent a person skiing. In this example, the machine learning model can generate a reframed version of the frame in a 1:1 aspect ratio so that the person skiing appears centered within the dimensions of a frame in the 1:1 aspect ratio. In various embodiments, the machine learning model can be tuned. For example, in some embodiments, the video processing module 104 can expose an aggressiveness parameter to tune the aggressiveness with which the machine learning model reframes content to preserve salient information in the content. The aggressiveness parameter can be adjusted so the machine learning model is more likely or less likely to crop frames of a video. Depending on the embodiment, the aggressiveness parameter can be set manually or automatically. For example, a video of a single person who remains substantially centered in frames of the video can more easily be reframed than a video of a football game that involves multiple players whose motion extends to frame borders of the video. In this example, the aggressiveness parameter can be defined so the machine learning model more aggressively crops frames of the video of the single person. In contrast, the aggressiveness parameter can be defined so the machine learning model less aggressively crops frames of the video of the football game. In some embodiments, viewers of reframed versions of videos can provide feedback on video quality and framing. For example, after viewing a reframed version of a video, a viewer can provide a numerical score to rate video quality and framing. In such embodiments, user feedback can be aggregated and used to retrain the machine learning model. For example, the machine learning model can be retrained to be more or less aggressive when cropping frames in a particular source aspect ratio to achieve a particular target aspect ratio. In another example, the machine learning model can be retrained to avoid reframing videos for particular aspect ratios. Many variations are possible.

A reframed version of a video can be associated with a confidence score (e.g., a numerical value, text label, etc.). The confidence score can reflect the quality or integrity of the reframed version of the video. The confidence score for the reframed version of the video can be determined by aggregating respective confidence scores determined for individual frames of the reframed version of the video. In some embodiments, a machine learning model can be trained to determine respective confidence scores for frames in a reframed video. For example, the machine learning model can determine a confidence score for a frame in the reframed video based on visual features represented in the frame, such as borders, graphics, and an amount and size of text represented in the frame. The machine learning model can be retrained to refine such confidence scores based on user feedback, as described above. Other considerations that inform the confidence score are possible.

Figure 2C:
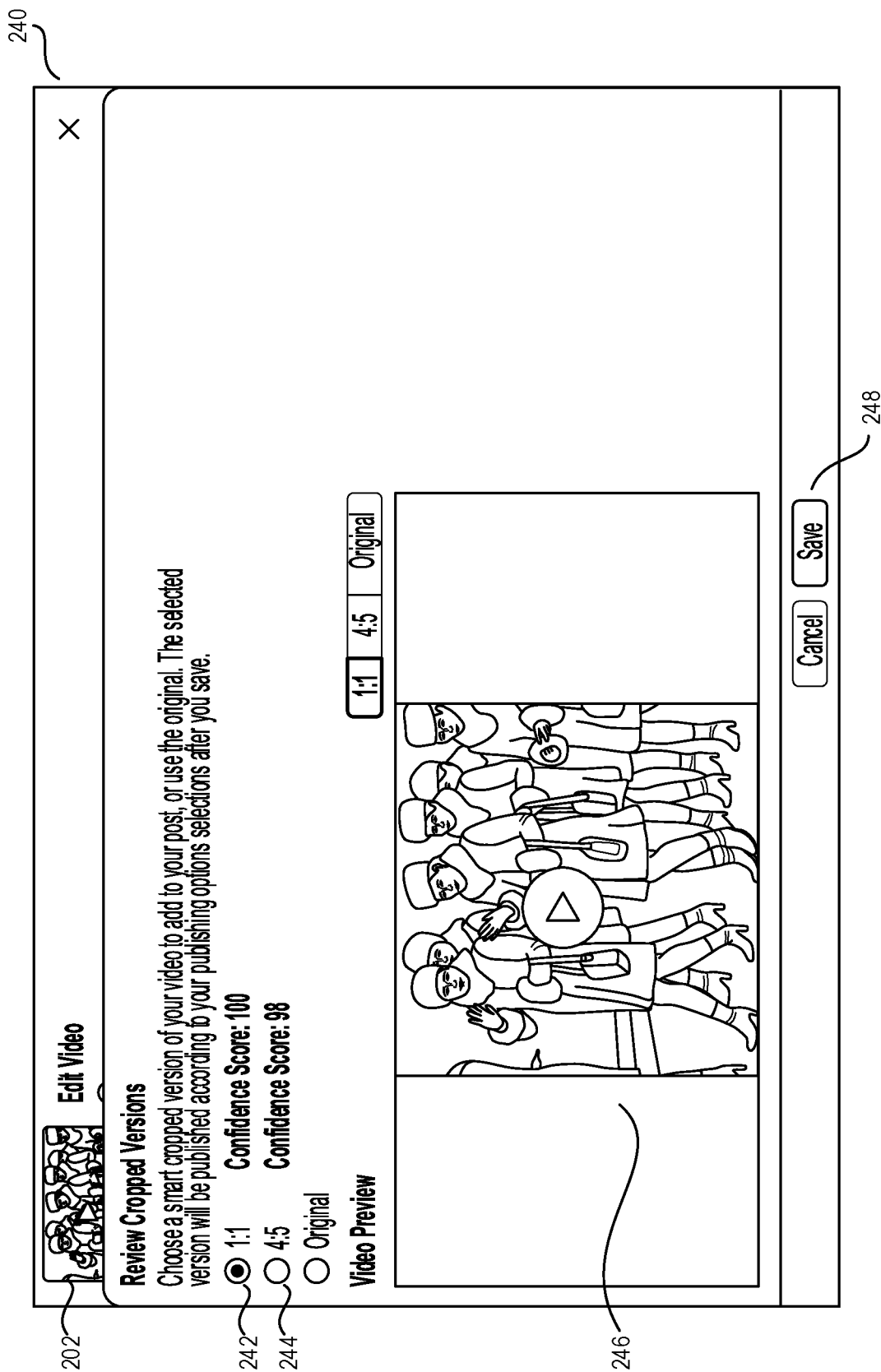

The video processing module 104 can provide an interface 240 generated by the computing device of the user to review reframed versions of the video 202, as illustrated in the example of FIG. 2C. In the example of FIG. 2C, the interface 240 includes a first option 242 to review a first version of the video 202 that was reframed in a 1:1 aspect ratio and a second option 244 to review a second version of the video 202 that was reframed in a 4:5 aspect ratio. The interface 240 can also provide respective confidence scores determined for the reframed versions of the video 202. Further, the interface 240 provides a region 246 in which the reframed versions of the video 202 can be reviewed prior to publication. A user accessing the interface 240 can select one or more of the reframed versions of the video 202 to be posted. For example, the user can select the first option 242 and a save option 248 to publish the first version of the video 202 through the content provider 102. The first version of the video 202 can also be associated with multiple video encodings at various bitrates. Many variations are possible. For example, in some embodiments, a user can download a reframed version of a video that is optimized for display through a video platform that is different from the content provider 102. In this example, the user can upload and share the reframed version of the video via the different video platform.

In various embodiments, the video processing module 104 can be configured to generate and automatically publish a reframed version of the video in a selected aspect ratio. For example, a user can select the second option 228 and a target aspect ratio 230 (e.g., 1:1, 4:5, etc.) for the video 202, as shown in FIG. 2B. In this example, the video processing module 104 can generate a reframed version of the video 202 in the selected target aspect ratio 230. The video processing module 104 can apply one or more machine learning models to reframe the video 202, as described above. Further, the video processing module 104 can publish the reframed version of the video 202 in the selected target aspect ratio 230. Thus, under the second option 228, the video processing module 104 can automatically publish the reframed version of the video 202 without user review of the reframed version. The reframed version of the video 202 can be associated with multiple video encodings at various bitrates. Again, many variations are possible.

In various embodiments, the video processing module 104 can be configured to generate multiple reframed versions of a video for automatically optimized distribution based on consumption surface. For example, a user can select the third option 232 as shown in FIG. 2B. In this example, the video processing module 104 can generate multiple reframed versions of the video 202 in different aspect ratios without further input from a user. For example, the video processing module 104 can generate a first reframed version of the video 202 in a 1:1 aspect ratio, a second reframed version of the video 202 in a 4:5 aspect ratio, and a third reframed version of the video 202 in a 2:1 aspect ratio. The different reframed versions of the video 202 can be stored, for example, in the data store 150. The different reframed versions of the video 202 can be provided to client devices on-the-fly based on their consumption surfaces, as described below.

The surface-based provisioning module 106 can provide videos for display on client devices. For example, the surface-based provisioning module 106 can process a request for a video from a client device. The surface-based provisioning module 106 can determine a consumption surface associated with the client device. In this example, the surface-based provisioning module 106 can respond to the request by providing a version of the video that is best suited for display on the consumption surface. In general, a consumption surface can be defined based on a number of parameters. For example, a consumption surface can be defined based on device type (e.g., mobile, desktop, tablet, smart watch, etc.), screen resolution, device orientation (e.g., portrait, landscape, tilted, etc.), an application, a dimension of the application (e.g., newsfeed tab, watch tab, etc.), or a combination thereof. Other considerations may also inform a consumption surface. For example, a video uploaded in a 16:9 aspect ratio can be associated with a first reframed version of the video in a 1:1 aspect ratio, a second reframed version of the video in a 4:5 aspect ratio, and a third reframed version of the video in a 2:1 aspect ratio. When the video is requested by a client device, the surface-based provisioning module 106 can determine parameters describing a consumption surface associated with the client device. For example, the parameters can be obtained from the client device when the video is requested. Based on the consumption surface, the surface-based provisioning module 106 can provide a version of the video that is best suited for display on the client device. In this example, the surface-based provisioning module 106 can provide the original video in the 16:9 aspect ratio, the first reframed version of the video in the 1:1 aspect ratio, the second reframed version of the video in the 4:5 aspect ratio, or the third reframed version of the video in the 2:1 aspect ratio. More details relating to surface-based content provisioning are provided below in reference to FIGS. 3A-3C.

Figure 3A:
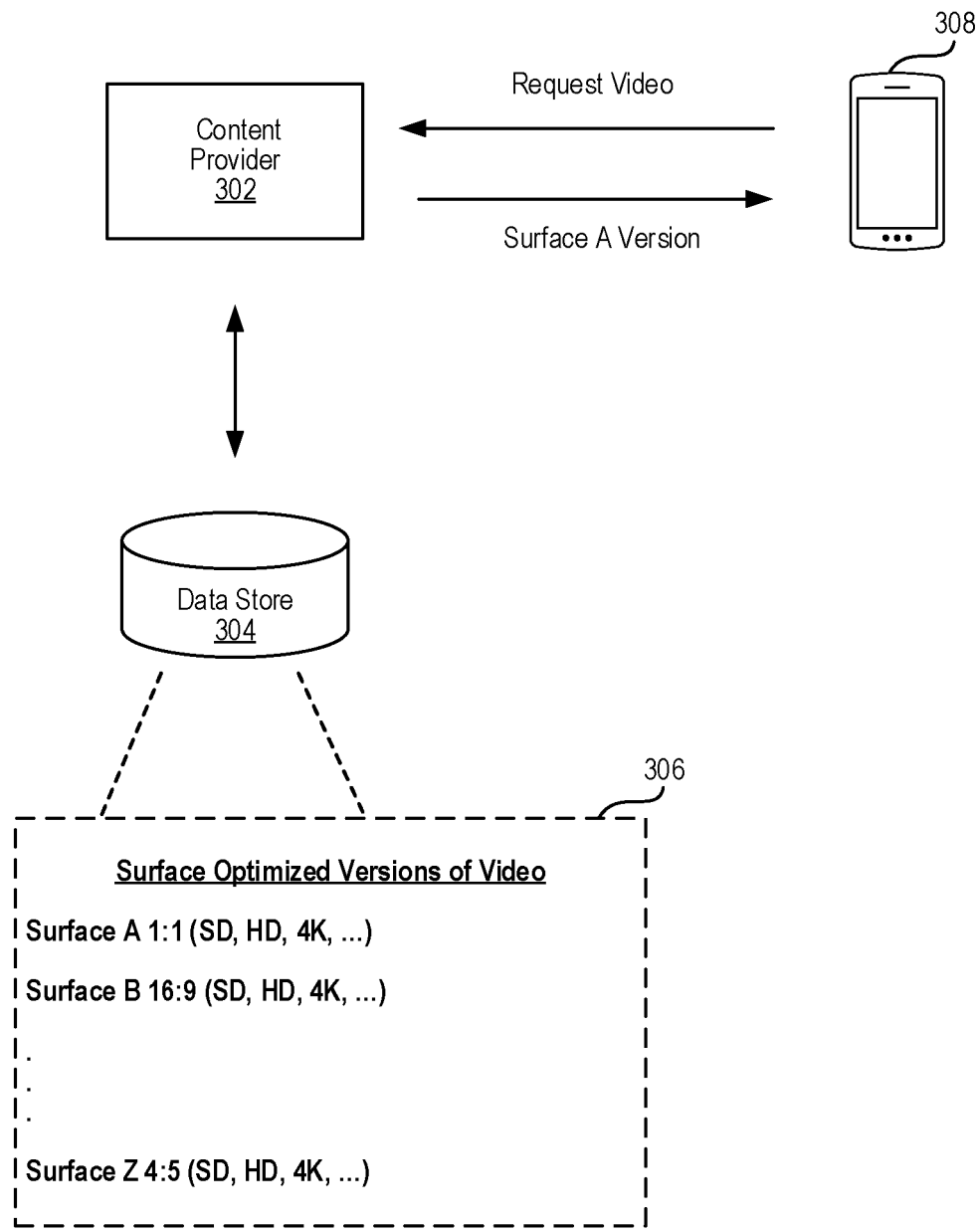
FIGS. 3A-3C illustrate examples of providing videos based on consumption surface, according to an embodiment of the present technology.
Figure 3B:
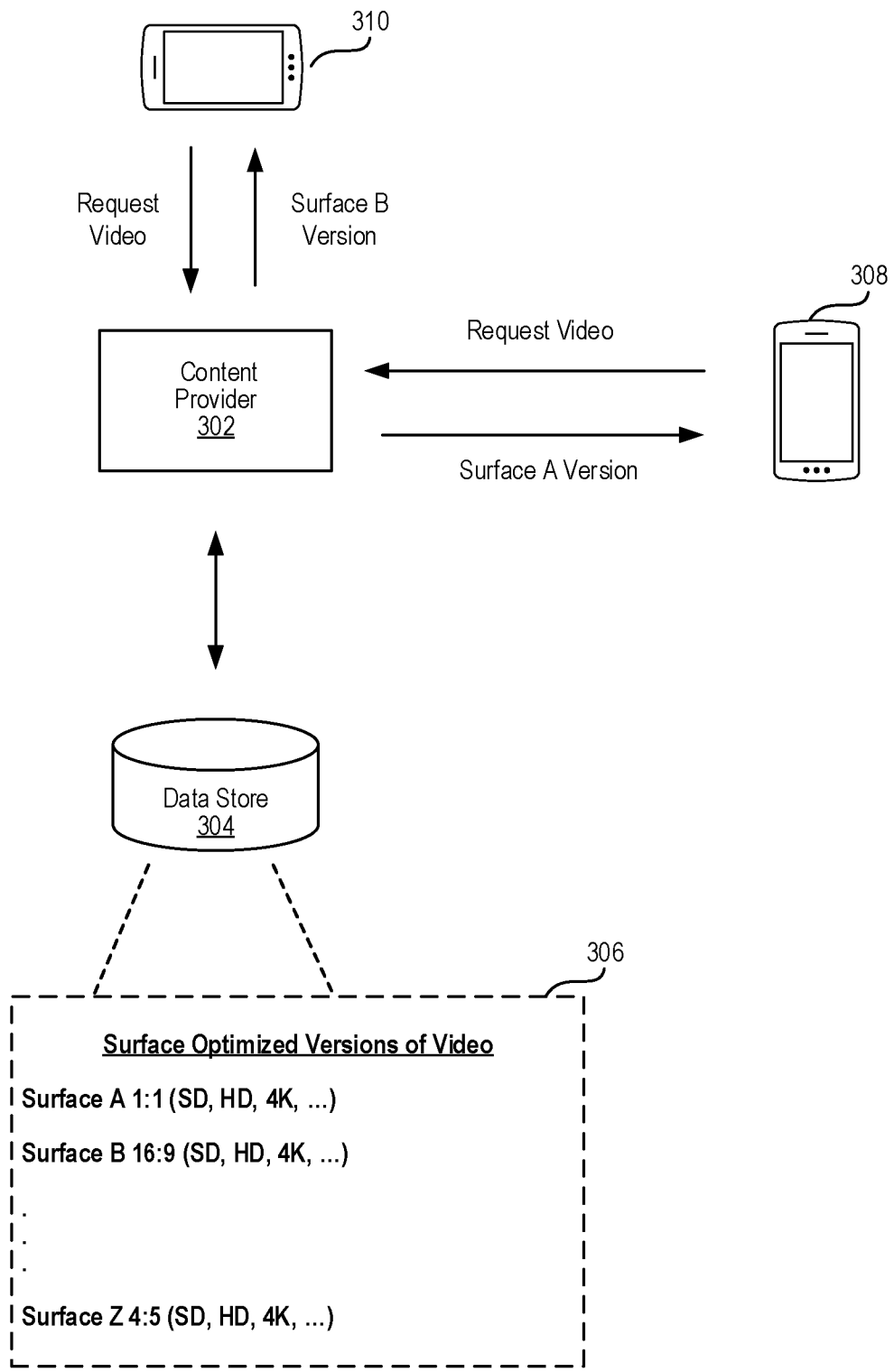
Figure 3C:
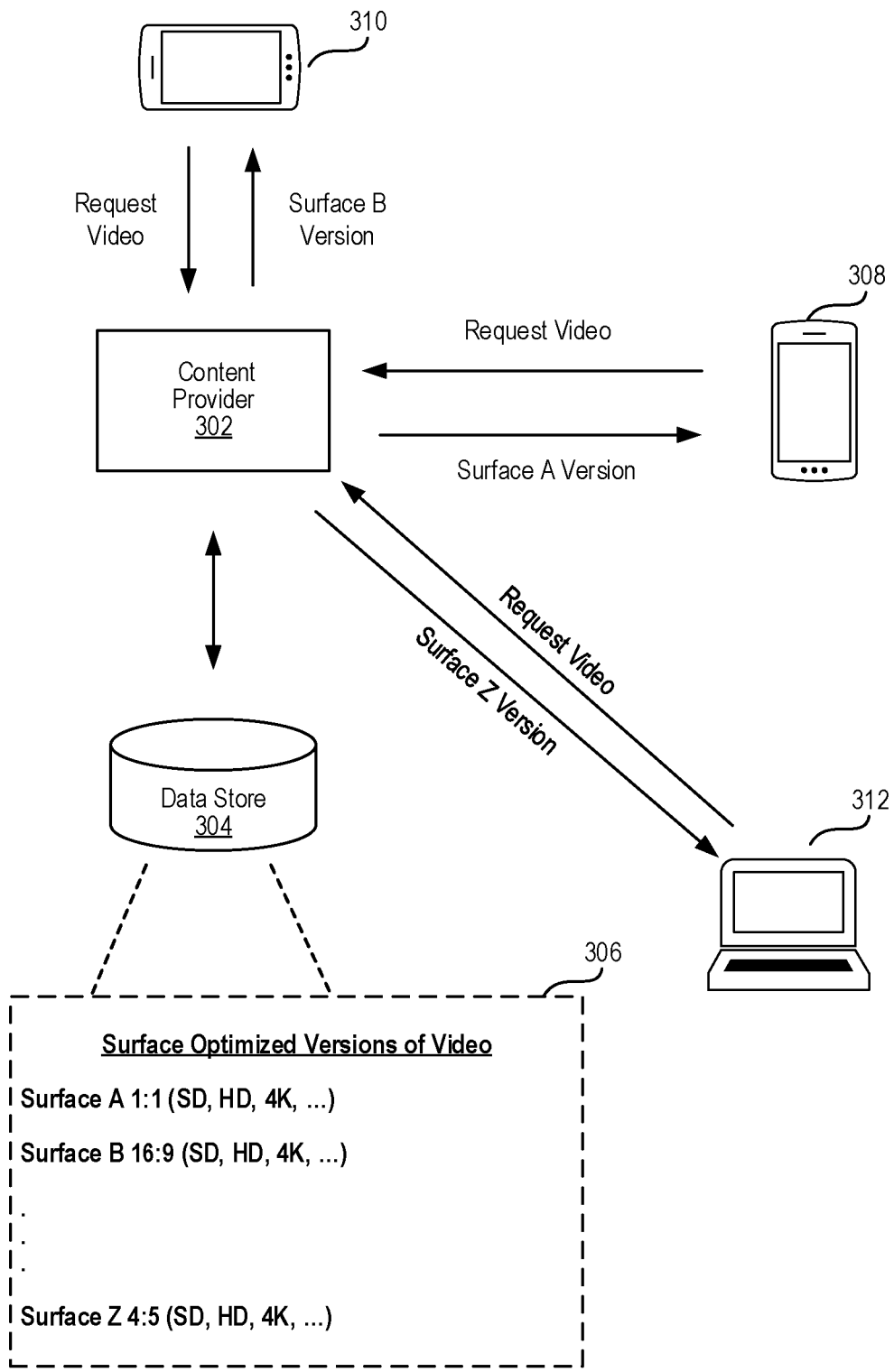

FIGS. 3A-3C illustrate example provisioning of video content based on consumption surface, according to an embodiment of the present technology. The example provisioning can be associated with one or more functionalities performed by the video processing module 104 and the surface-based provisioning module 106 of FIG. 1. It should be understood that there can be additional, fewer, or alternative steps performed in similar or alternative orders, or in parallel, based on the various features and embodiments discussed herein unless otherwise stated.

FIG. 3A illustrates an example interaction between a content provider 302 and a client device 308. The content provider 302 can be in communication with a data store 304. The data store 304 can store multiple versions 306 of a video that have been reframed for display on various consumption surfaces. The multiple versions 306 correspond to aspect ratios associated with consumption surfaces. For example, the data store 304 can store a "Surface A" version of the video that has been optimized for display on client devices associated with Surface A. For example, the Surface A version of the video can be reframed for display in a 1:1 aspect ratio. Similarly, the data store 304 can store a "Surface B" version of the video that has been optimized for display on client devices associated with Surface B. For example, the Surface B version of the video can be reframed for display in a 16:9 aspect ratio. Further, the data store 304 can store a "Surface Z" version of the video that has been optimized for display on client devices associated with Surface Z. For example, the Surface Z version of the video can be reframed for display in a 4:5 aspect ratio. In some embodiments, each version of the video can be associated with multiple video encodings to support various bandwidth capabilities. For instance, a version of the video may be associated with a standard definition (SD) encoding, a high definition (HD) encoding, and a 4K encoding. In this example, the content provider 302 can provide a particular encoding of the version of the video based on bandwidth capabilities of a client device. In the example of FIG. 3A, the client device 308 can request the video from the content provider 302, for example, over one or more networks. When the video is requested, the content provider 302 can obtain parameters describing a consumption surface associated with the client device 308. The parameters can indicate, for example, a type of the client device 308 (e.g., mobile, desktop, tablet, smart watch, etc.), a screen resolution of a display associated with the client device 308, and device orientation. Based on these parameters, the content provider 302 can identify a version of the video that is best suited for presentation on a display screen associated with the client device 308. In this example, the content provider 302 determines that the client device 308 is associated with Surface A, which corresponds to a mobile device in a portrait orientation. Accordingly, the content provider 302 can obtain and provide a version of the video that was generated for display on devices associated with Surface A. In various embodiments, the content provider 302 can select a particular encoding of the Surface A version of the video based on bandwidth capabilities of the client device 308.

FIG. 3B illustrates an example interaction between the content provider 302 and a client device 310. In the example of FIG. 3B, the client device 310 can request the video from the content provider 302, for example, over one or more networks. When the video is requested, the content provider 302 can obtain parameters describing a consumption surface associated with the client device 310. Based on these parameters, the content provider 302 can identify a version of the video that is best suited for presentation of a display screen associated with the client device 310. In this example, the content provider 302 determines that the client device 310 is associated with Surface B, which corresponds to a mobile device in a landscape orientation. Accordingly, the content provider 302 can obtain and provide a version of the video that was generated for display on devices associated with Surface B. In various embodiments, the content provider 302 can select a particular encoding of the Surface B version of the video based on bandwidth capabilities of the client device 310.

FIG. 3C illustrates an example interaction between the content provider 302 and a client device 312. In the example of FIG. 3C, the client device 312 can request the video from the content provider 302, for example, over one or more networks. When the video is requested, the content provider 302 can obtain parameters describing a consumption surface associated with the client device 312. Based on these parameters, the content provider 302 can identify a version of the video that is best suited for presentation of a display screen associated with the client device 312. In this example, the content provider 302 determines that the client device 312 is associated with Surface Z, which corresponds to a desktop device. Accordingly, the content provider 302 can obtain and provide a version of the video that was generated for display on devices associated with Surface Z. In various embodiments, the content provider 302 can select a particular encoding of the Surface Z version of the video based on bandwidth capabilities of the client device 312. Many variations are possible.

Figure 4:
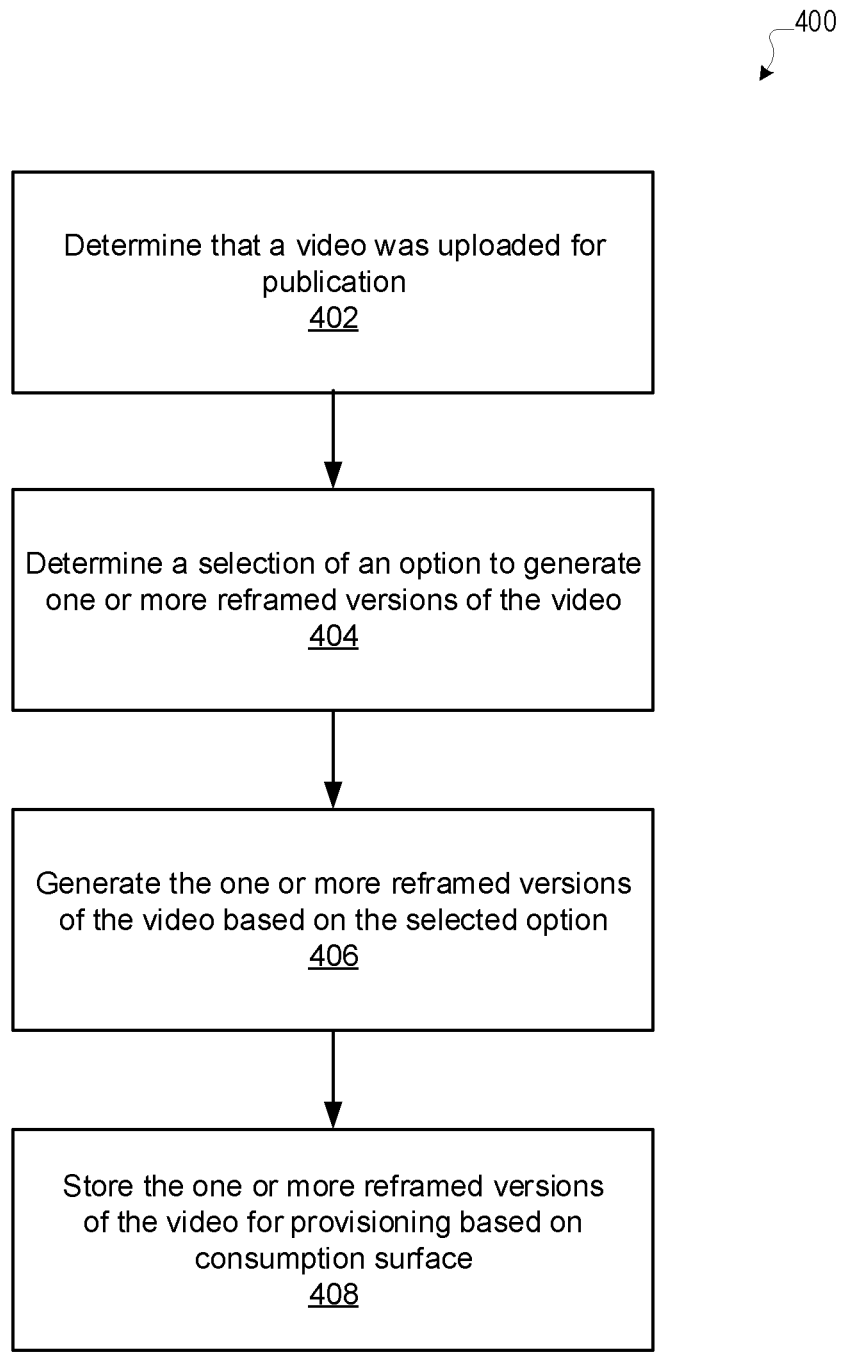
FIG. 4 illustrates an example method, according to an embodiment of the present technology

FIG. 4 illustrates an example method 400, according to an embodiment of the present technology. It should be understood that there can be additional, fewer, or alternative steps performed in similar or alternative orders, or in parallel, based on the various features and embodiments discussed herein unless otherwise stated. At block 402, the example method 400 can determine that a video was uploaded for publication. At block 404, the example method 400 can determine a selection of an option to generate one or more reframed versions of the video. At block 406, the example method 400 can generate the one or more reframed versions of the video based on the selected option. At block 408, the example method 400 can store the one or more reframed versions of the video. The reframed versions of the video can be provided to client devices based on consumption surfaces associated with the client devices.

Figure 5:
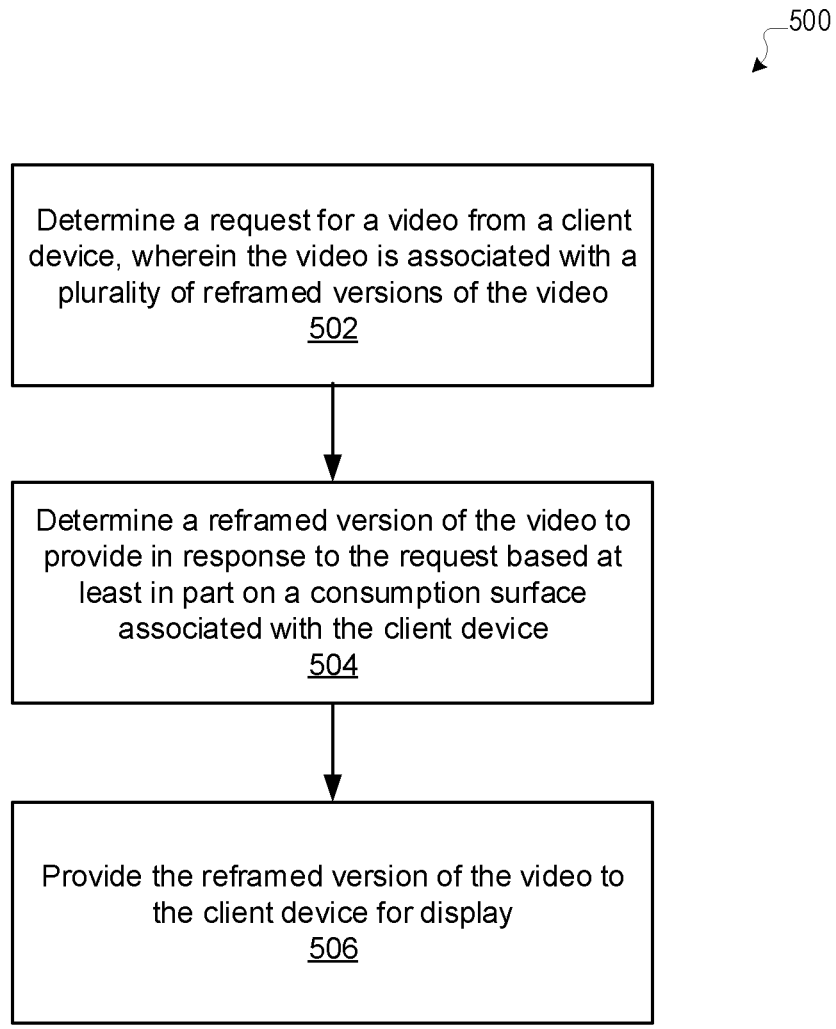
FIG. 5 illustrates another example method, according to an embodiment of the present technology.

FIG. 5 illustrates an example method 500, according to an embodiment of the present technology. It should be understood that there can be additional, fewer, or alternative steps performed in similar or alternative orders, or in parallel, based on the various features and embodiments discussed herein unless otherwise stated. At block 502, the example method 500 can determine a request for a video from a client device, wherein the video is associated with a plurality of reframed versions of the video. At block 504, the example method 500 can determine a reframed version of the video to provide in response to the request based at least in part on a consumption surface associated with the client device. At block 506, the example method 500 can provide the reframed version of the video to the client device for display.

It is contemplated that there can be many other uses, applications, and/or variations associated with the various embodiments of the present technology. For example, in some cases, a user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
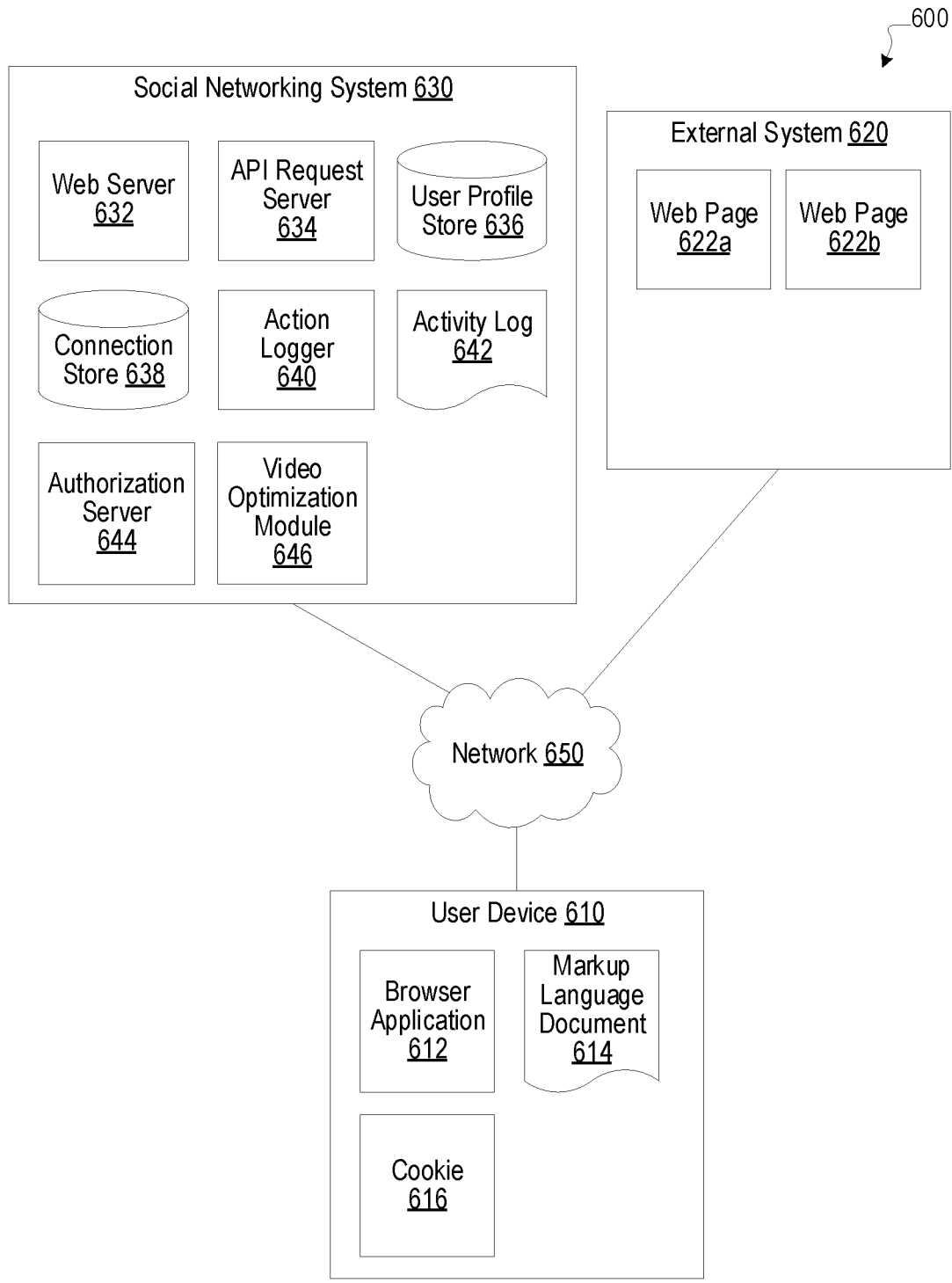
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a video optimization module 646. The video optimization module 646 can be implemented with, for example, the video processing module 104 and the surface-based provisioning module 106, as discussed in more detail herein. In some embodiments, some functionality of the video optimization module 646 can be performed by the user device 110. It should be appreciated that there can be many variations or other possibilities.

Hardware Implementation

Figure 7:
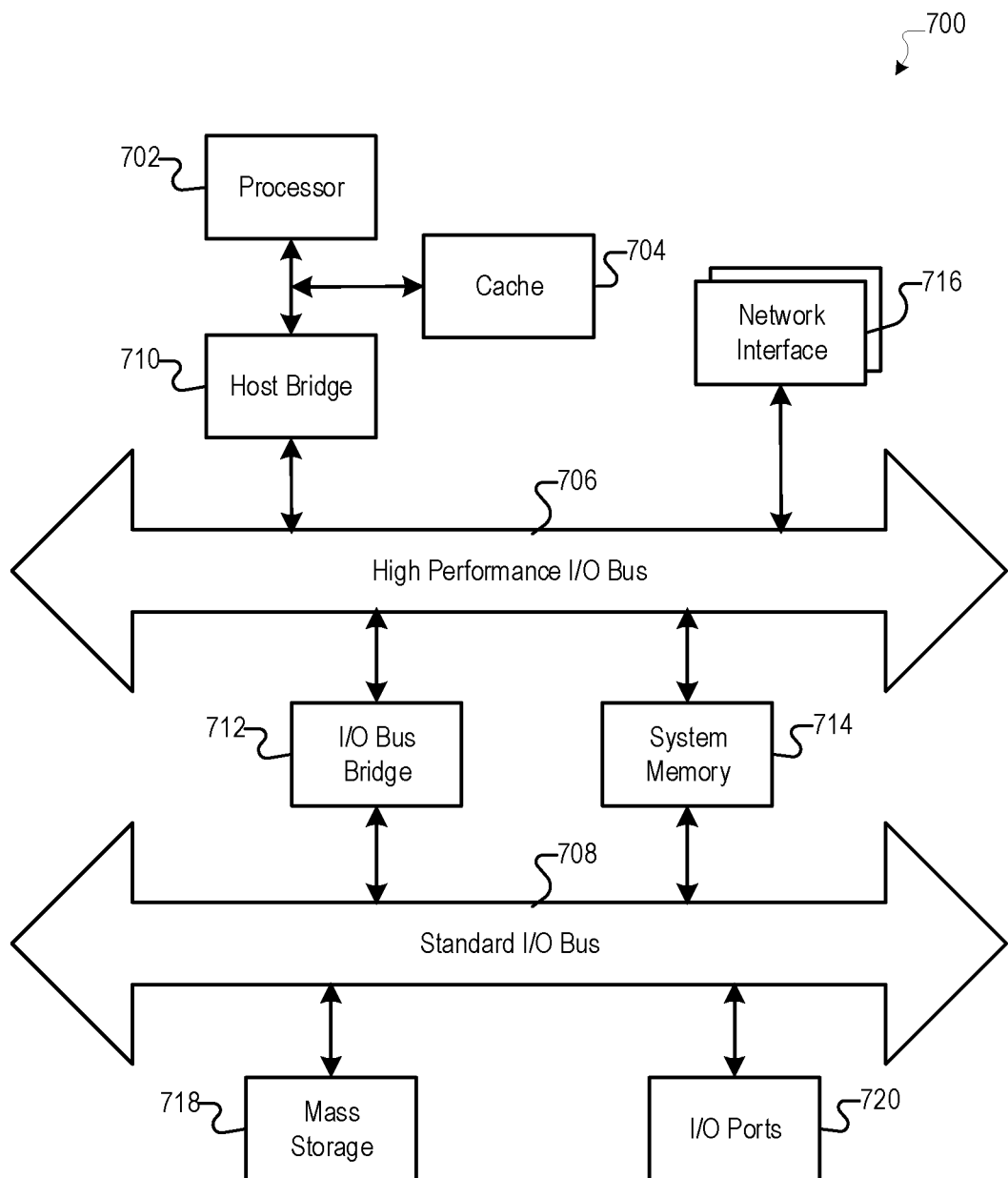
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a request for a video from a client device, wherein the video is associated with a plurality of reframed versions of the video;
   determining, by the computing system, a reframed version of the video to provide in response to the request based at least in part on a consumption surface associated with the client device; and
   providing, by the computing system, the reframed version of the video to the client device for display.

2. The computer-implemented method of claim 1, wherein the plurality of reframed versions of the video include at least a first reframed version of the video in a first aspect ratio and a second reframed version of the video in a second aspect ratio.

3. The computer-implemented method of claim 1, wherein the reframed version of the video corresponds to a given aspect ratio, and wherein the reframed version of the video includes one or more frames of the video that were reframed to fit dimensions associated with the aspect ratio.

4. The computer-implemented method of claim 3, wherein a frame of the video is reframed based on cropping the frame, stretching the frame, or adjusting a zoom level associated with the frame.

5. The computer-implemented method of claim 3, wherein a machine learning model is applied to reframe the frame based on visual features represented in the frame.

6. The computer-implemented method of claim 5, wherein the visual features include one or more people represented in the frame, graphics represented in the frame, an amount and size of text represented in the frame, or borders associated with the frame.

7. The computer-implemented method of claim 5, wherein the machine learning model can be tuned based on a parameter to adjust a level of aggressiveness with which the one or more frames are reframed.

8. The computer-implemented method of claim 5, wherein the machine learning model is tuned based on user feedback that rates a quality of the reframed version of the video.

9. The computer-implemented method of claim 1, wherein the consumption surface is determined based on one or more parameters associated with the client device, and wherein the one or more parameters include a device type associated with the client device, a screen resolution of a display screen associated with the client device, a display orientation of the client device, or a combination thereof.

10. The computer-implemented method of claim 1, wherein the plurality of reframed versions of the video include at least one version of the video that has been reframed in a 1:1 aspect ratio, a 4:5 aspect ratio, a 2:1 aspect ratio, or a 16:9 aspect ratio.

11. A system comprising:
at least one processor; and
a memory storing instructions that, when executed by the at least one processor, cause the system to perform:
determining a request for a video from a client device, wherein the video is associated with a plurality of reframed versions of the video;
determining a reframed version of the video to provide in response to the request based at least in part on a consumption surface associated with the client device; and
providing the reframed version of the video to the client device for display.

12. The system of claim 11, wherein the plurality of reframed versions of the video include at least a first reframed version of the video in a first aspect ratio and a second reframed version of the video in a second aspect ratio.

13. The system of claim 11, wherein the reframed version of the video corresponds to a given aspect ratio, and wherein the reframed version of the video includes one or more frames of the video that were reframed to fit dimensions associated with the aspect ratio.

14. The system of claim 13, wherein a frame of the video is reframed based on cropping the frame, stretching the frame, or adjusting a zoom level associated with the frame.

15. The system of claim 13, wherein a machine learning model is applied to reframe the frame based on visual features represented in the frame.

16. A non-transitory computer-readable storage medium including instructions that, when executed by at least one processor of a computing system, cause the computing system to perform:
determining a request for a video from a client device, wherein the video is associated with a plurality of reframed versions of the video;
determining a reframed version of the video to provide in response to the request based at least in part on a consumption surface associated with the client device; and
providing the reframed version of the video to the client device for display.

17. The non-transitory computer-readable storage medium of claim 16, wherein the plurality of reframed versions of the video include at least a first reframed version of the video in a first aspect ratio and a second reframed version of the video in a second aspect ratio.

18. The non-transitory computer-readable storage medium of claim 16, wherein the reframed version of the video corresponds to a given aspect ratio, and wherein the reframed version of the video includes one or more frames of the video that were reframed to fit dimensions associated with the aspect ratio.

19. The non-transitory computer-readable storage medium of claim 18, wherein a frame of the video is reframed based on cropping the frame, stretching the frame, or adjusting a zoom level associated with the frame.

20. The non-transitory computer-readable storage medium of claim 18, wherein a machine learning model is applied to reframe the frame based on visual features represented in the frame.

* * * * *